(12) United States Patent
Börchers et al.

(10) Patent No.: US 11,885,294 B2
(45) Date of Patent: Jan. 30, 2024

(54) WIND TURBINE, WIND TURBINE ROTOR BLADE, AND BLADE BEARING FOR A WIND TURBINE

(71) Applicant: Wobben Properties GmbH, Aurich (DE)

(72) Inventors: Rasmus Börchers, Bremen (DE); Falko Bürkner, Bremen (DE); Jörg Schüller, Bremen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/150,851

(22) Filed: Jan. 15, 2021

(65) Prior Publication Data

US 2021/0222669 A1 Jul. 22, 2021

(30) Foreign Application Priority Data

Jan. 17, 2020 (DE) .......................... 102020101089.3

(51) Int. Cl.
*F03D 1/06* (2006.01)
*F03D 80/70* (2016.01)

(52) U.S. Cl.
CPC .......... *F03D 1/0658* (2013.01); *F03D 1/0675* (2013.01); *F03D 80/70* (2016.05);
(Continued)

(58) Field of Classification Search
CPC ...... F03D 1/0658; F03D 1/0675; F03D 80/70; F05B 2240/50; F05B 2260/79; F05B 2260/301
See application file for complete search history.

(56) References Cited

U.S. PATENT DOCUMENTS 7,854,592 B2  12/2010  Bech
8,282,353 B2  10/2012  Russ et al.
(Continued)

FOREIGN PATENT DOCUMENTS

DE  102005026141 A1  12/2006
DE  202012002913 U1  4/2012
(Continued)

*Primary Examiner* — Courtney D Heinle
*Assistant Examiner* — Sang K Kim
(74) *Attorney, Agent, or Firm* — Seed IP Law Group

(57) ABSTRACT

The disclosure concerns a wind turbine, comprising: a hub with a hollow cylindrical region with a mean circumference $U_N$; at least one rotor blade mounted rotatably on the hub, with a blade laminate which extends in the longitudinal direction of the rotor blade and at least in portions forms a hollow cylinder with a mean circumference $U_R$; and at least one blade bearing for mounting the rotor blade on the hub, with a first bearing ring which is arranged on the hub side and connected by means of a first flange connection to a rotor hub flange formed on a rotor-blade side end portion of the hub, wherein the first flange connection has at least one hub longitudinal bolt which is arranged on a circumference $U_{NB}$ coaxially to the blade bearing; and a second bearing ring which is arranged on the rotor blade side and connected by means of a second flange connection to a rotor blade flange formed on a hub-side end portion of the rotor blade, wherein the second flange connection has at least one rotor blade longitudinal bolt which is arranged on a circumference $U_{RB}$ coaxially to the blade bearing. The disclosure achieves the fundamental object in that a first radial offset $V_1$ is formed between the circumference $U_N$ and the circumference $U_{NB}$, and/or a second radial offset $V_2$ is formed between the circumference $U_{RB}$ and the circumference $U_R$. In a further aspect, the disclosure achieves the fundamental object with a wind turbine rotor blade and a rotor blade bearing.

11 Claims, 4 Drawing Sheets

(52) U.S. Cl.
CPC ..... *F05B 2240/30* (2013.01); *F05B 2260/301* (2013.01); *F05B 2260/79* (2013.01)

(56) References Cited

U.S. PATENT DOCUMENTS

| | | | |
|---|---|---|---|
| 9,551,324 B2 * | 1/2017 | Minadeo | F03D 80/70 |
| 9,879,656 B2 * | 1/2018 | Schröppel | F03D 80/70 |
| 2009/0175724 A1 | 7/2009 | Russ et al. | |
| 2009/0263250 A1 * | 10/2009 | Quell | F03D 1/0658 |
| | | | 416/204 R |
| 2014/0003946 A1 | 1/2014 | Moore et al. | |
| 2014/0010660 A1 | 1/2014 | Handreck | |
| 2015/0086359 A1 | 3/2015 | Jacobsen et al. | |
| 2018/0230965 A1 | 8/2018 | Ejlersen et al. | |
| 2019/0072083 A1 * | 3/2019 | Elmose | F03D 1/0658 |

FOREIGN PATENT DOCUMENTS

| | | |
|---|---|---|
| DE | 102016203269 A1 | 8/2017 |
| DE | 102018110925 A1 | 11/2019 |
| EP | 2 530 301 A1 | 12/2012 |
| JP | 2013-137074 A | 7/2013 |
| WO | 2007/098759 A2 | 9/2007 |

* cited by examiner

WIND TURBINE, WIND TURBINE ROTOR BLADE, AND BLADE BEARING FOR A WIND TURBINE

BACKGROUND

Technical Field

The present disclosure concerns a wind turbine.

Description of the Related Art

Wind turbines are generally known. They have at least one rotor blade which is mounted rotatably on the hub by means of a blade bearing. The angle of attack of the rotor blade to the wind relative to the hub is established usually using a pitch drive. The decisive loads on a blade bearing are bending moments which are caused by loads from own weight and the wind load. The bending moments are absorbed for example in the rotational direction by the blade bracing in the region of the blade laminate as longitudinal forces.

In blade bearings, in particular roll mountings, of this type a radial offset in the outer longitudinal force can occur. The offset generates a moment which "crimps" both the bearing and the adjacent components and leads to an increased load. In large diameter bearings and rotors, the local moments induced by longitudinal forces are negligible. If however the rotor blade diameter is selected very small for the respective blade length, for example for transport reasons or to save material, the longitudinal forces are increased and hence also the local moments from the offsets, such that the flange connections and in particular the bolts of the flange connections can be overloaded.

In the German priority application, the German Patent and Trademark Office researched the following documents: DE 10 2005 026 141 A1, DE 10 2016 203 269 A1, DE 10 2018 110 925 A1, US 2014/0003946 A1, US 2014/0010660 A1, US 2015/0086359 A1, US 2018/0230965 A1, US 2019/0072083 A1 and WO 2007/098759 A2.

BRIEF SUMMARY

The present disclosure is directed to a wind turbine, comprising: a hub having a hollow cylindrical region with a mean circumference $U_N$; at least one rotor blade mounted rotatably on the hub and having a blade laminate which extends in the longitudinal direction of the rotor blade and at least partially forms a hollow cylinder with a mean circumference $U_R$; and at least one blade bearing for mounting the rotor blade on the hub, having a first bearing ring which is arranged on the hub side and connected by means of a first flange connection to a rotor hub flange formed on a rotor-blade-side end portion of the hub, wherein the first flange connection comprises at least one hub longitudinal bolt which is arranged on a circumference $U_{NB}$ coaxially to the blade bearing, a second bearing ring which is arranged on the rotor blade side and connected by means of a second flange connection to a rotor blade flange formed on a hub-side end portion of the rotor blade, wherein the second flange connection has at least one rotor blade longitudinal bolt which is arranged on a circumference $U_{RB}$ coaxially to the blade bearing.

Provided are embodiments for increasing the load-bearing capacity of blade bearings of wind turbines of the type cited initially such that smaller flange diameters can be used for the same load level.

In particular, the disclosure proposes, in wind turbines of the type cited initially, that a first radial offset $V_1$ is formed between the circumference $U_N$ and the circumference $U_{NB}$, and/or a second radial offset $V_2$ is formed between the circumference $U_{RB}$ and the circumference $U_R$.

In this way, the flange connected to the respective bearing ring is actively "crimped" and hence the bearing movement is restricted. Since however, the two components twist in the same direction, the crimping moment of the flange connection to be transmitted is reduced, relieving the load thereon.

This promotes an increase in load-bearing capacity of the flange connection between the rotor blade and/or rotor hub and the mounting, and the components coupled thereto.

The crimping moment results from the eccentricity between the force flow transmitted through the bolts of the respective flange connection, and the position of the centre of gravity in the radial direction of the blade laminate or hollow cylindrical region of the hub. The crimping moment constitutes a load of a flat system perpendicular to its plane, and as a single stress resultant generates the bending moment which, in a rotationally symmetrical bearing, is thus divided into tension and pressure and can deform the bearing out of its plane.

The hollow cylindrical region reduces the material usage. The hub flange offers a load-bearing connection, in particular a flange connection, to the blade bearing. Because of the different circumferences $U_N$ and $U_{NB}$, the bolted connections by means of the hub longitudinal bolts of the first flange connection between the blade bearing and the hub are easily accessible and can be adequately tightened.

Preferably, the first bearing ring is an outer bearing ring, and the second bearing ring is an inner bearing ring arranged within the outer bearing ring, and the circumference $U_{RB}$ is larger than the circumference $U_R$.

In this way, in particular the rotor blade flange is actively crimped and thus follows the bearing movement. Since however, the two components twist in the same direction, the crimping moment of the flange connection to be transmitted is reduced, relieving the load thereon.

Preferably, the second bearing ring is an outer bearing ring, and the first bearing ring is an inner bearing ring arranged in the outer bearing ring, and the circumference $U_{RB}$ is smaller than the circumference $U_R$.

In this way, in particular the hub flange is actively crimped and thus follows the bearing movement. Since however, the two components twist in the same direction, the crimping moment of the flange connection to be transmitted is reduced, relieving the load thereon.

Further preferably, the blade bearing, in particular the second bearing ring, comprises an extension portion for extending the clamping length of the rotor blade longitudinal bolt.

The disclosure here uses the knowledge that by extending the mounting on the rotor blade side, preferably the bearing ring connected to the rotor blade, the stiffness of the bearing against crimping deformation is increased. The offset between the rotor blade longitudinal bolts and the hub longitudinal bolts has a significant influence on the crimping deformation of the bearing, but for design regions cannot be reduced. Thus, at least a stiffening of the bearing counters a crimping deformation and increases the load-bearing capacity of the bearing.

The bearing ring and the extension portion are in particular connected together preferably by substance bonding or formed as an integral component. Further preferably, alternatively or additionally, a form-fit or force-fit connection may be created.

According to a preferred refinement, the extension portion comprises a first rotor-blade-side contact face of the extension portion, and a second bearing-side contact face, wherein the first contact face of the extension portion is larger than or equal to the second bearing-side contact face.

The stiffening of the bearing against crimping and the blade-side enlargement of the support face allow a reduction in the material usage of the bearing.

Preferably, the first rotor-blade-side contact face is formed corresponding to the contact face of the rotor blade flange, and the second bearing-side contact face is formed corresponding to the contact face of the blade bearing, in particular of the second bearing ring.

The reduction of the blade flange diameter significantly increases the longitudinal forces, whereby again the material strength at the blade flange is increased. This leads to the thickness of the blade flange exceeding the width of the bearing ring, and thus no longer lying completely on the surface of the bearing. Because of the widening of the bearing in the direction of the blade flange, or the taper in the direction of the bearing, the blade flange is completely supported even with small bearing diameters. Thus the material usage is reduced and the crimping stiffness of the bearing further increased.

The concept of corresponding mutual formation of two faces means that they are preferably formed congruently, or at least the projection faces are formed congruently, and the faces provide mutual support.

Preferably, the blade bearing is a rolling bearing, preferably a roller bearing, in particular preferably a cylindrical roller, spherical roller, or tapered roller bearing. A roller bearing provides a mounting with high load-bearing capacity in the radial direction.

According to an alternative preferred embodiment, the roller bearing is a single-row or multi-row four-point bearing. The use of a four-point bearing as a blade bearing allows absorption of axial loads in both directions and of bending moments. Preferably, a single-row or double-row four-point bearing is used, and depending on the drive concept, in particular the arrangement of the pitch drive, is configured with internal or external toothing, or without toothing.

The term four-point bearing designates roller bearings, and in particular a special form of angular ball bearing having a contact pressure angle of $\alpha \approx 35°$. There are four contact points of the roller body with the raceways. The split inner ring or outer ring allows more balls to be used with a smaller dimension. For this reason, the axial and radial forces which can be absorbed in both directions are increased.

The disclosure has been described above in a first aspect with reference to a wind turbine, and in a further aspect the disclosure also concerns a wind turbine rotor blade with an end portion with a rotor blade flange for hub-side mounting on a blade bearing which is configured to be connected by means of a flange connection to an inner bearing ring of a blade bearing of a wind turbine, and a blade laminate which extends in the longitudinal direction of the rotor blade and in the region of a second end portion forms a hollow cylinder with a mean circumference $U_R$, wherein the flange connection has at least one rotor blade longitudinal bolt which is arranged on a circumference $U_{RB}$ coaxially to the blade bearing.

Provided is a wind turbine rotor blade in that a radial offset $V_2$ is formed between the circumference $U_{RB}$ and/or the circumference $U_R$. The wind turbine rotor blade benefits from the same advantages and preferred embodiments as the wind turbine according to the first aspect, so to avoid repetition, reference is made to the statements above.

In a further aspect, provided is a blade bearing for mounting a rotor blade on a hub of a wind turbine, with a first bearing ring arranged on the hub side and connected by means of a first flange connection to the rotor blade hub, and a second bearing ring arranged on the rotor blade side and connected by means of a second flange connection to the rotor blade flange.

The blade bearing in that the blade bearing, in particular the second bearing ring, has an extension portion for extending the clamping length of the second flange connection, in particular a rotor blade longitudinal bolt of the second flange connection.

The blade bearing benefits from the same advantages and preferred embodiments as the wind turbine according to the first aspect, so to avoid repetition, reference is made to the statements above.

BRIEF DESCRIPTION OF THE SEVERAL VIEWS OF THE DRAWINGS

The disclosure is now described in more detail below with reference to the attached drawings showing preferred exemplary embodiments. The drawings show.

DETAILED DESCRIPTION

Figure 1:
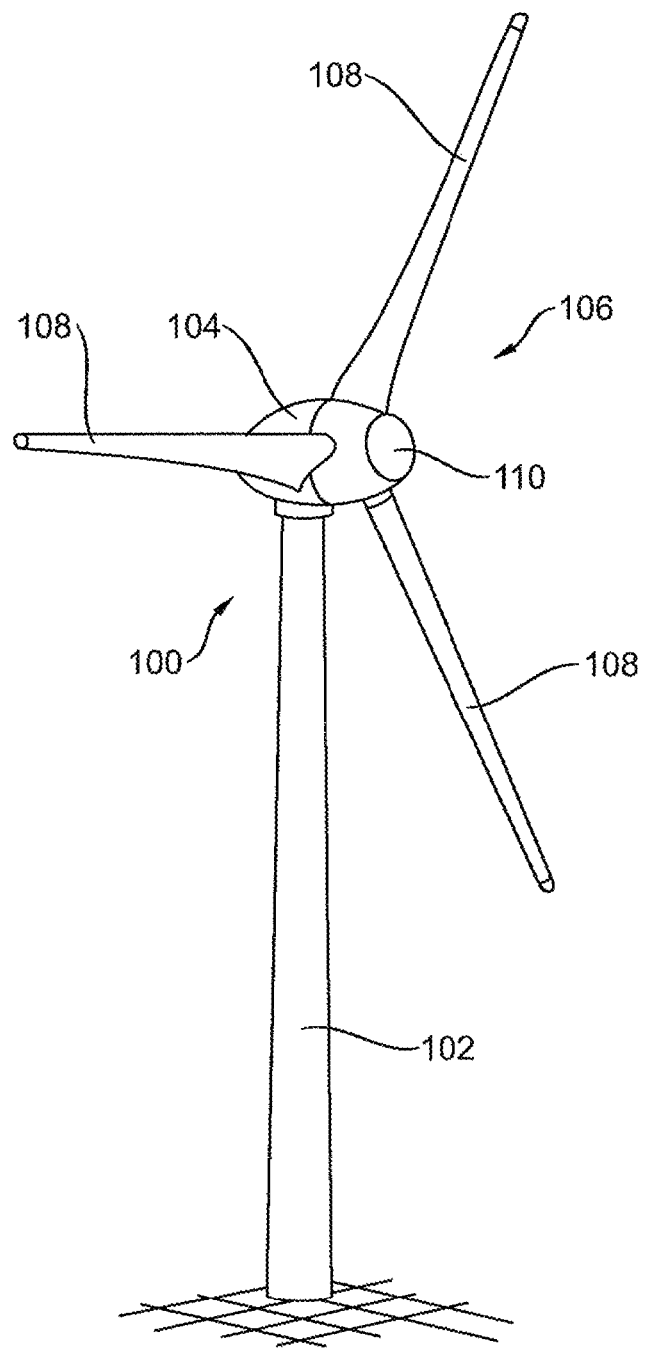
FIG. 1 shows a wind turbine, schematically in a perspective view.

FIG. 1 shows a wind turbine 100 with a tower 102 and a nacelle 104. A rotor 106 with three rotor blades 108 and a spinner 110 is arranged on the nacelle 104. The rotor blades 108 are arranged with their rotor blade flange on a rotor hub. In operation, the rotor 106 is set in a rotational movement by the wind and thereby drives a generator (not shown) in the nacelle 104.

Figure 2:
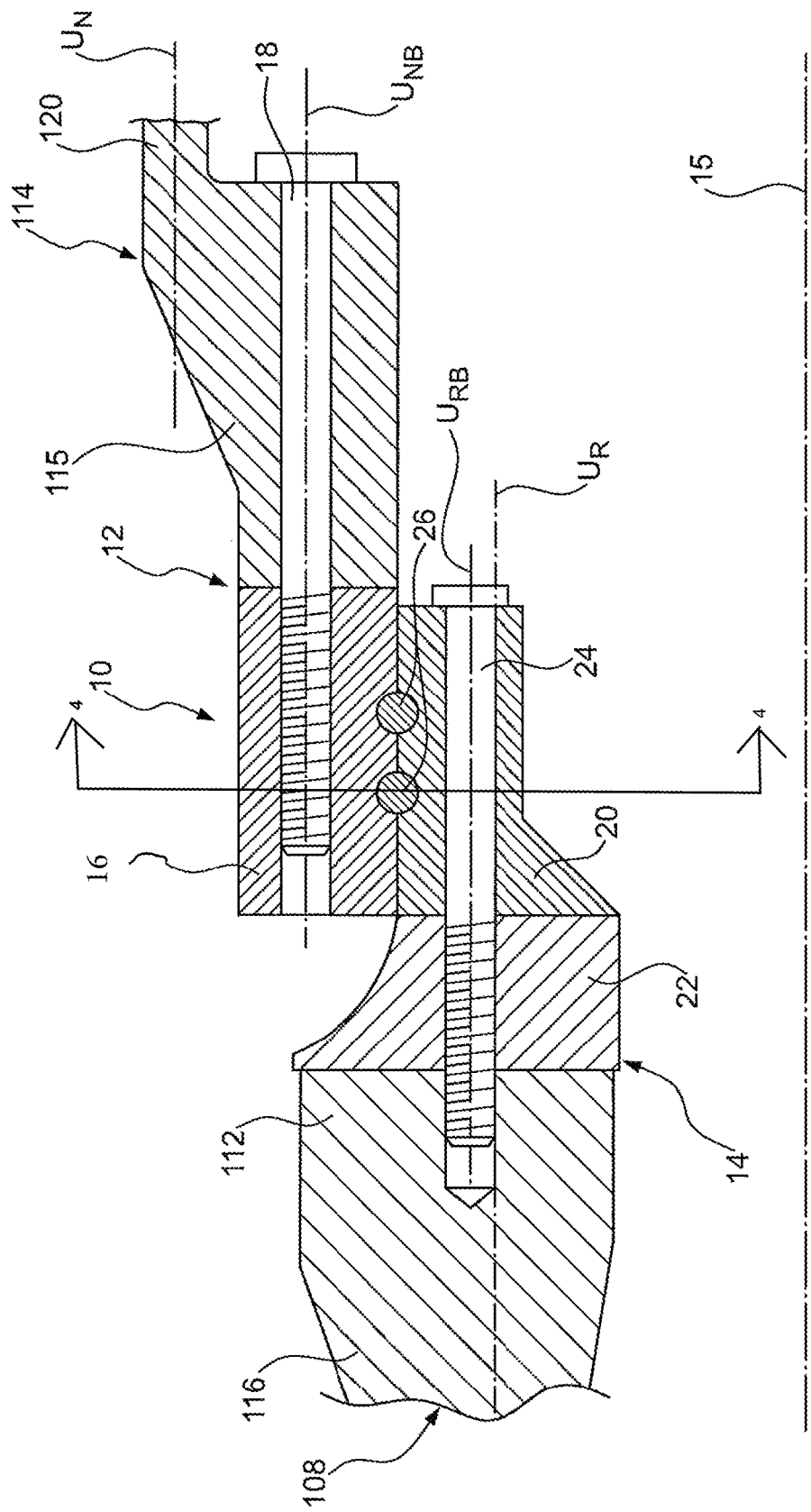
FIG. 2 shows a sectional depiction of an extract from the wind turbine from FIG. 1.

FIG. 2 shows a sectional depiction of an extract from the wind turbine from FIG. 1. The rotor blade 108 is here mounted rotatably on the rotor hub 114 by means of a blade bearing 10.

The rotor blade 108 and the hub 114 are formed so as to be coaxial to the mounting 10 and symmetrical about a rotational axis 15.

The rotor blade 108 comprises the rotor blade flange 112 and a blade laminate 116 which extends in the longitudinal direction of the rotor blade 108. The blade laminate 116 is preferably formed from a fiber composite material as a hollow cylinder with a mean circumference $U_R$. The rotor blade flange 112 here has a diameter which increases in the direction of the blade bearing 10, and on the bearing side is configured at least in portions as a hollow cylinder with a mean circumference $U_{RB}$.

The rotor hub 114 comprises a hub flange 115 and a hollow cylindrical region 120 with a mean circumference $U_N$.

The blade bearing 10 comprises a first bearing ring 16 which is connected to the rotor hub flange 115 by means of a first flange connection 12, and a second bearing ring 20 which is connected to the rotor blade flange 112 by means of a second flange connection 14.

The blade bearing 10 is configured as a four-point bearing. The first bearing ring 16 and the second bearing ring 20 are arranged so as to be rotatable on each other by means of two rows of roller bodies 26. The second bearing ring 20 here has a smaller diameter than the first bearing ring 16, and is mounted rotatably therein.

Optionally, a gearwheel, which can be brought into engagement with drives in order to adjust the pitch angle, may be formed on the outside of the first bearing ring 16 or on the inside of the second bearing ring 20.

The first flange connection 12, which is formed by the first bearing ring 16 of the blade bearing 10 and the hub flange 115, comprises rotor hub longitudinal bolts 18 for force-fit connection of the hub flange 115 and the first bearing ring 16. The rotor hub longitudinal bolts 18 are arranged along a circumference $U_{NB}$. The circumference $U_{NB}$ is smaller than the mean circumference $U_N$ of the hollow cylindrical region 120 of the hub 114.

The second flange connection 14 is formed between the rotor blade flange 112 and a second bearing ring 20 of the blade bearing 10. The blade flange 112 is connected to the bearing ring 20 by force fit by means of the rotor blade longitudinal bolts 24. The rotor blade longitudinal bolts 24 are arranged along a circumference $U_{RB}$. The circumference $U_{RB}$ is larger than the mean circumference $U_R$ in the hollow cylindrical region of the blade laminate. The second bearing ring 20 comprises an extension portion 22 on its blade-side end. The extension portion 22 has a contact face which increases in size on the blade side. Because of the enlarged contact face, the full surface of the rotor blade flange 112 lies on the extension portion 22 of the bearing ring 20.

Figure 3:
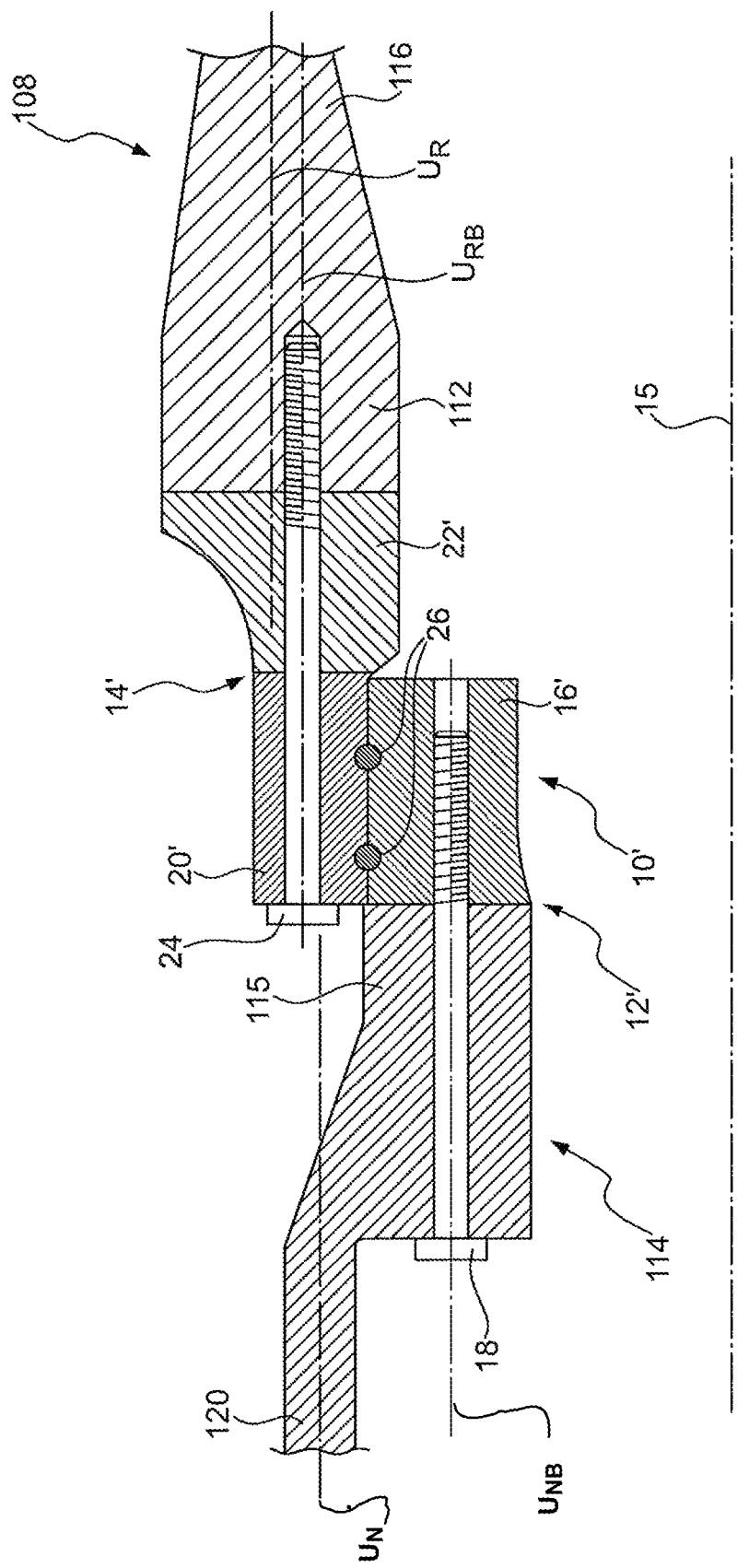
FIG. 3 shows an extract of the wind turbine according to an alternative preferred embodiment.

FIG. 3 shows an extract of the wind turbine according to an alternative preferred embodiment.

The rotor blade 108 is here mounted rotatably on the rotor hub 114 by means of a blade bearing 10'. The rotor blade 108 and the hub 114 are formed similarly to the exemplary embodiment shown in FIG. 2.

The blade bearing 10' comprises a first bearing ring 16' which is connected to the rotor hub flange 115 by means of a first flange connection 12', and a second bearing ring which is connected to the rotor blade flange 112 by means of a second flange connection 14'.

The first bearing ring 16' is here arranged in the second outer bearing ring 20' so that the rotor hub 114 is mounted rotatably in the rotor blade 108 by means of the blade bearing 10'.

The rotor hub flange 115 is connected to the inner bearing ring 16' of the blade bearing 10' by means of the rotor hub longitudinal bolts 18 and forms a first flange connection 12'.

The second flange connection 14' is formed by the outer second ring 20' and the rotor blade flange 112, and is connected by means of the rotor blade longitudinal bolts 24. The rotor blade longitudinal bolts 24 are arranged along a circumference $U_{RB}$. The circumference $U_{RB}$ is smaller than the circumference $U_R$ which forms the mean circumference of the blade laminate 116.

Figure 4:
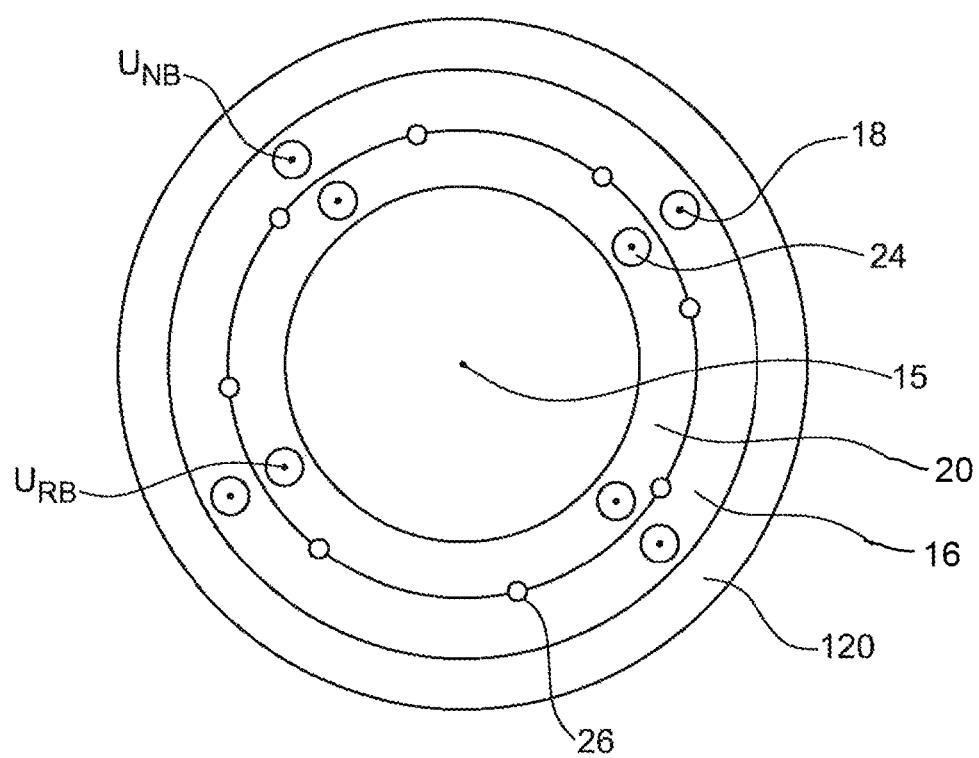
FIG. 4 shows the sectional depiction from FIG. 2 in a top view.

FIG. 4 shows an extract of the sectional depiction of the wind turbine from FIG. 2 in a top view. The rotor blade 108 comprises the rotor blade flange 112 and the laminated rotor blade 116 with the mean circumference $U_R$. The rotor blade 108 is here mounted rotatably on the rotor hub 114 by means of a blade bearing 10. The rotor hub 114 comprises the rotor hub flange 115 and the hollow cylindrical region 120 with the mean circumference $U_N$.

As FIG. 4 shows in particular, in the embodiment according to FIG. 2, the rotor hub longitudinal bolts 18 of the first flange connection 12 are arranged on a circumference $U_{NB}$ which is smaller than the mean circumference $U_N$ of the hollow cylindrical region 120 of the rotor hub 114.

The rotor hub flange 115 is connected to the outer bearing ring 16 of the blade bearing 10 by means of the rotor hub longitudinal bolts 18. An inner bearing ring 20 is rotatably mounted in the outer bearing ring 16 by means of a plurality of roller bodies 26.

The second flange connection 14 is formed by the inner bearing ring 20 and the rotor blade flange 112, and is connected by means of the rotor blade longitudinal bolts 24. The rotor blade longitudinal bolts 24 are arranged along a circumference $U_{RB}$. The circumference $U_{RB}$ is larger than the circumference $U_R$ which forms the mean circumference of the blade laminate 116.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind turbine, comprising:
   a hub having a rotor hub flange configured to connect with a rotor blade and a cylindrical region outward of the rotor hub flange, the cylindrical region having a first mean circumference, the cylindrical region forming a hollow center region;
   a rotor blade mounted rotatably on the hub and having a blade laminate extending in a longitudinal direction of the rotor blade, the blade laminate having a hub-side end portion that is shaped as a hollow cylinder with a second mean circumference; and
   at least one blade bearing for supporting the rotor blade on the hub, at least a portion of the at least one blade bearing having a constant thickness and having:
      a first bearing ring arranged at a hub side and connected by a first flange connection to the rotor hub flange, wherein the first flange connection comprises at least one hub longitudinal bolt arranged on a first circumference coaxially to the blade bearing; and
      a second bearing ring arranged at a rotor blade side and connected by a second flange connection to a rotor blade flange, wherein the second flange connection has at least one rotor blade longitudinal bolt arranged on a second circumference coaxially to the blade bearing,
      wherein each of the first mean circumference, the first circumference, the second circumference, and the second mean circumference are offset from each other and are coaxial with respect to one another.

2. The wind turbine according to claim 1, wherein the first bearing ring is an outer bearing ring, and the second bearing ring is an inner bearing ring arranged within the outer bearing ring, and the second circumference coaxially to the blade bearing is larger than the second mean circumference.

3. The wind turbine according to claim 1, wherein the second bearing ring is an outer bearing ring, and the first bearing ring is an inner bearing ring arranged in the outer bearing ring, and the second circumference coaxially to the blade bearing is smaller than the second mean circumference.

4. The wind turbine according claim 1, wherein the second bearing ring comprises an extension portion for extending a clamping length of the at least one rotor blade longitudinal bolt of the second flange connection.

5. The wind turbine according to claim 4, wherein:
the extension portion comprises a first rotor-blade-side contact face and a second bearing-side contact face, and
the first rotor-blade-side contact face is larger than or equal to the second bearing-side contact face.

6. The wind turbine according to claim 5, wherein:
the first rotor-blade-side contact face of the extension portion corresponds to a contact face of the rotor blade flange, and
the second bearing-side contact face of the extension portion corresponds to a contact face of the second bearing ring of the blade bearing.

7. The wind turbine according to claim 1, wherein the blade bearing is a rolling bearing.

8. The wind turbine according to claim 1, wherein the blade bearing is a roller bearing that is a cylindrical roller, spherical roller, or tapered roller bearing.

9. A rotor blade bearing for mounting a rotor blade on a hub, the rotor blade bearing comprising:
at least one first bearing ring which is arranged on a hub side and connected to a rotor blade hub by a first flange connection that includes a first longitudinal bolt; and
a second bearing ring which is arranged on a rotor blade side and connected to a rotor blade flange by a second flange connection that includes a second longitudinal bolt,
wherein the blade bearing comprises an extension portion for extending a clamping length of the second flange connection,
wherein the extension portion comprises a first contact face on the rotor blade side and a second contact face, wherein the first contact face is larger than the second contact face, and
wherein a size and a shape of a contact face of the rotor blade corresponds to a size and a shape of the first contact face of the extension portion, and the second contact face of the extension portion has a shape that corresponds to a shape of a contact face of the second bearing ring,
wherein a first mean circumference of the rotor blade hub, a second mean circumference of the rotor blade, a central axis of the first longitudinal bolt, a central axis of the second longitudinal bolt are offset from each other and are coaxial with respect to one another.

10. The rotor blade bearing according to claim 9, wherein the second bearing ring comprises the extension portion.

11. The rotor blade bearing according to claim 9, wherein the second flange connection is a rotor blade longitudinal bolt of the second flange connection.

* * * * *